Sept. 18, 1928.
R. V. WOODWORTH
CUTTING DIE
Filed Sept. 23, 1927
1,684,934
3 Sheets-Sheet 1
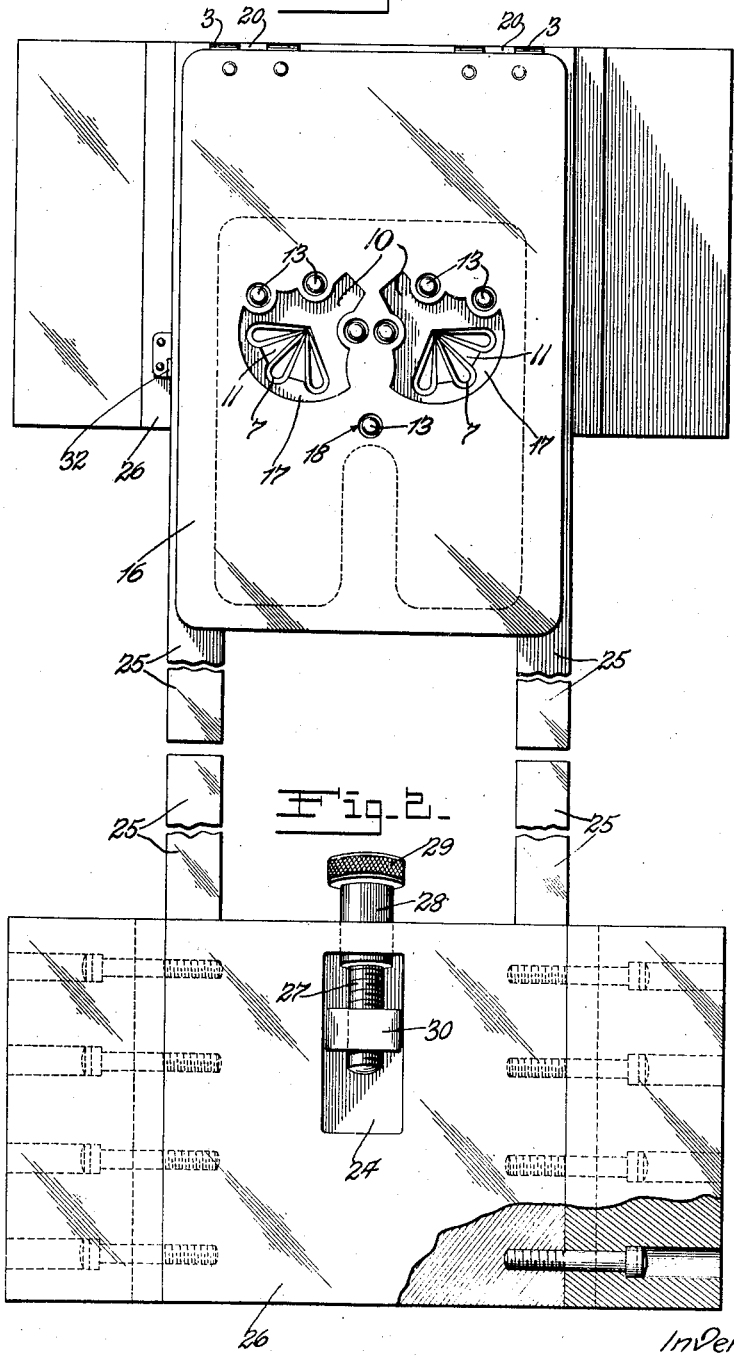
Inventor:
Roy V. Woodworth,
by Rippey & Kingsland.
His Attorneys.

Sept. 18, 1928.  R. V. WOODWORTH  1,684,934
CUTTING DIE
Filed Sept. 23, 1927   3 Sheets-Sheet 2
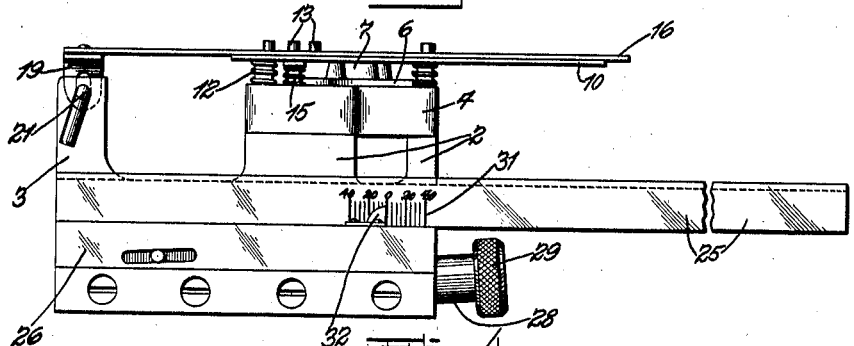
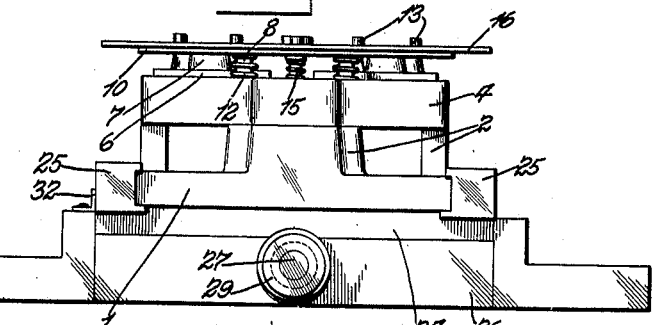
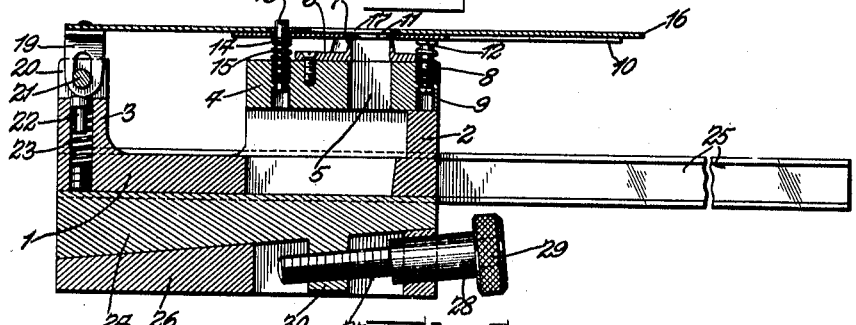
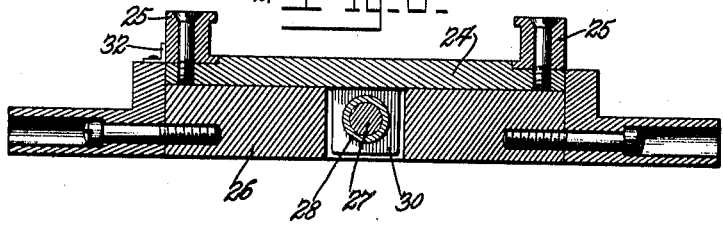

Sept. 18, 1928.
R. V. WOODWORTH
1,684,934
CUTTING DIE
Filed Sept. 23, 1927    3 Sheets-Sheet 3
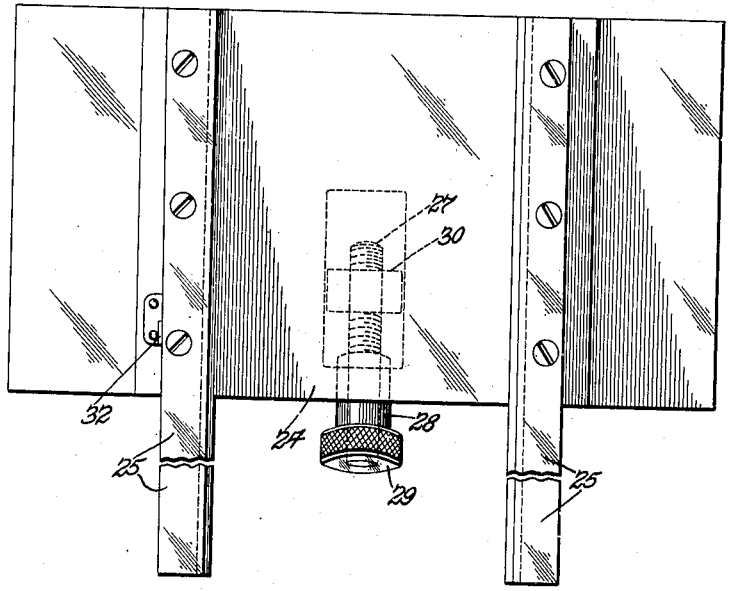
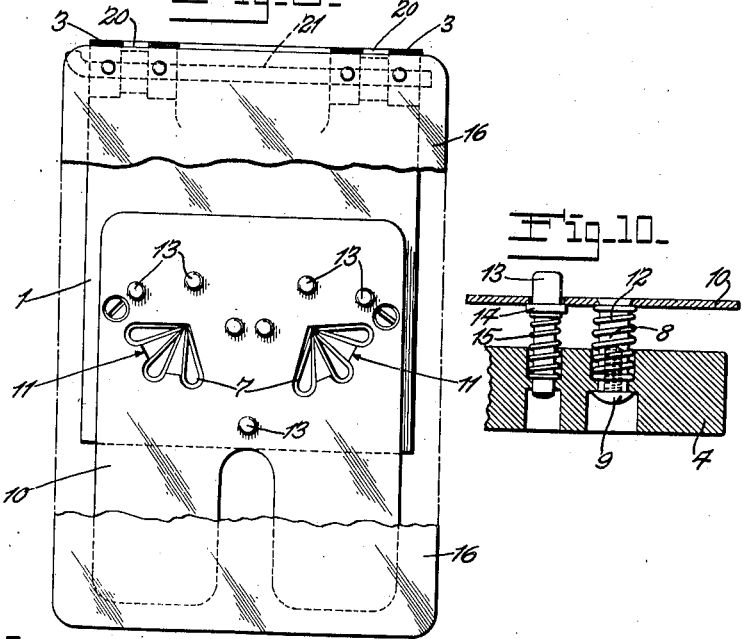
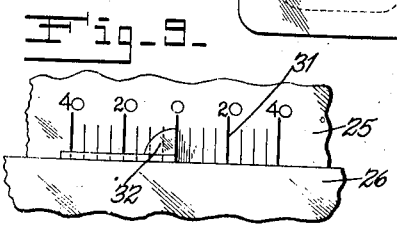
Inventor:
Roy V. Woodworth,
by Rippey & Kingsland.
His Attorneys.

Patented Sept. 18, 1928.

1,684,934

UNITED STATES PATENT OFFICE.

ROY V. WOODWORTH, OF ST. LOUIS, MISSOURI, ASSIGNOR TO WESTERN SUPPLIES CO., OF ST. LOUIS, MISSOURI, A CORPORATION OF MISSOURI.

CUTTING DIE.

Application filed September 23, 1927. Serial No. 221,496.

This invention relates to cutting dies, and has special reference to dies for cutting leather and other materials to form ornamental pieces for use in shoes.

An object of the invention is to provide a cutting die of the character mentioned having improved means for locating the leather or other material upon the die preparatory for operation to cut the material.

Another object of the invention is to provide a cutting die wherein the cutters extend from a rigid die block, in combination with a plate having openings through which the die cutters extend when the plate has moved downwardly, and a series of springs for supporting the plate and arranged to yield under the pressure of a press or plunger when the die machine is operated so as to permit the cutters to cut into or through the material.

Another object of the invention is to provide a die of the character mentioned including a retaining plate mounted in a novel manner for holding the material upon the first mentioned plate.

Other objects will appear from the following description, reference being made to the drawings in which Fig. 1 is a plan view showing my improved cutting die on the support upon which it is mounted for use.

Fig. 2 is an inverted view of the support showing the device for adjusting one member of the support in different positions.

Fig. 3 is a side elevation of the cutting die mounted on the support.

Fig. 4 is a front elevation.

Fig. 5 is a longitudinal sectional view through the die and the support.

Fig. 6 is a transverse sectional view of the support for the cutting die.

Fig. 7 is a plan view of the support.

Fig. 8 is a plan view of the cutting die, a part of the pivoted retaining plate being broken away to show the supporting plate.

Fig. 9 is an enlarged view of the measuring scale on the adjustable member of the die support for use in making adjustments.

Fig. 10 is an enlarged detail view showing the manner in which the supporting plate for the material is attached to the die.

My improved cutting die comprises a frame including a base 1, a number of upward extensions 2 from the front portion of the base and a number of upward extensions 3 from the rear portion of the base. A block 4 is seated upon and rigidly secured to the upper ends of the extensions 2 and is provided with holes 5 for discharging the waste material passing from the cutting dies. One or more cutting dies are attached to the upper side of the die block 4, each of said dies comprising a plate 6 having cutters 7 in the form of flanges extending upwardly therefrom for cutting designs in the material and discharging the waste through the holes 5.

A number of pins 8 extend through holes in the die block 4 and have heads 9 secured to their lower ends to limit extent of upward movement. A material supporting and stripper plate 10 is attached to the upper ends of the pins 8 and has holes 11 therethrough to permit projection of the knife flanges 7 of the cutting dies therethrough to cut the material supported on said plate 10. A spring 12 encircles each of the pins 8, said springs having their lower ends bearing upon the block 4 and their upper ends bearing against the underside of the plate 10 so as to support said plate 10 in a position above the plane of the edges of the cutters 7, but yielding to permit downward movement of the plate to cut the material.

For each cutting die a number of abutments are provided for the edges of the material so that the material may be adjusted properly upon the plate 10. These abutments comprise pins 13 extending through holes in the block 4 and through the plate 10. Each pin 13 has a flange 14 below the plate 10. A spring 15 encircles each pin 13 between the flanges 14 and the base 4, the power of said springs being exerted to raise the pins 13, extent of upward movement of said pins being limited by engagement of the flanges 14 against the underside of the material supporting and stripper plate 10.

A holder plate 16 for the material is provided, the same having holes 17 for the respective cutting dies 7 and holes 18 for the abutment pins 13. The plate 16 has hinge brackets 19 attached to its rear edge and extending into notches 20 in the upper ends of the upward extensions 3. A hinge rod 21 supported by the extensions 3 passes through the hinge brackets 19 and pivotally supports the plate 16. A friction device 22 is pressed against each of the hinges 9 by a spring 23 and, as the lower end of each hinge 19 is eccentrically rounded (Fig. 5) the plate 16 will be supported in a raised position by pressure of the friction brakes 22 against the hinges. This facilitates the use and operation of the device so that the operator may use both hands in placing the material upon the cutting die, after which the plate 16 may be moved down onto the material.

The base 1 is mountable on and movable from an adjustable support 24. This support 24 has a pair of spaced guides 25 between which the base 1 of the cutting die is movable to its proper position within the machine. The lower side of the support 24 inclines downwardly and rearwardly (Fig. 5). The inclined lower surfaces of the support 24 is mounted on a rigid support 26, the upper surface of which inclines upwardly and forwardly to match the inclined lower side of the support 24. Obviously movement of the support 24 toward the left as seen in Fig. 5 will lower the cutting die mounted thereon and movement of the support 24 toward the right will raise the cutting die. The support 24 may be moved to accurate adjustments to raise and lower the cutting die in conformity with the thickness of the material. For this purpose I provide a screw 27 rotative in a rigid sleeve 28 and having an appropriate knob or handle 29 on its outer end. The sleeve 28 is rigid with the rigid part 26 and the threaded inner end of the screw 27 is screwed through a threaded hole in a projection 30 from the lower side of the adjustable support 24. Thus, by turning the screw 27 the support 24 may be moved up or down on the support 26, as desired.

To assist in obtaining the proper adjustment the outer side of one of the guides 25 is provided with a measuring scale 31 (Fig. 3) and the adjacent portion of the rigid support is provided with a pointer 32 for cooperation with the scale.

From the foregoing it will be seen that my invention is capable of rapid and easy use for cutting perforated designs in leather and other materials and is easily adjustable as required to accommodate materials of different thicknesses. The invention may be varied within equivalent limits without departure from the nature and principle of the invention and I contemplate such variations as may be within the scope of equivalent limits.

What I claim is:

1. A die comprising a base, a cutter extending upwardly from said base, a plate having an opening above and larger than said cutter, a series of guide pins for guiding said plate in its movements, springs encircling said pins and supporting said plate above the plane of the upper edge of said cutter, a series of abutments extending upwardly through and movable independently of said plate, springs for supporting said abutments, and parts on said abutment pins engaging against said plate and limiting upward movement of said guide pins.

2. A die comprising a base, a cutter extending upwardly from said base, a plate having an opening above and larger than said cutter, a series of guide pins for guiding said plate in its movements, springs encircling said pins and supporting said plate above the plane of the upper edge of said cutter, a series of abutments extending upwardly through and movable independently of said plate, springs for supporting said abutments, parts on said abutment pins engaging against said plate and limiting upward movement of said guide pins, a plate for holding the material upon said first named plate and having a hole larger than and above said cutter, and a pivot device supporting said second plate.

3. A die comprising a base, a cutter extending upwardly from said base, a plate having an opening above and larger than said cutter, a series of guide pins for guiding said plate in its movements, springs encircling said pins and supporting said plate above the plane of the upper edge of said cutter, a series of abutments extending upwardly through and movable independently of said plate, springs for supporting said abutments, parts on said abutment pins engaging against said plate and limiting upward movement of said guide pins, a plate for holding the material upon said first named plate and having a hole larger than and above said cutter, a pivot device supporting said second plate, and means cooperating with said pivot device for supporting said second plate in raised position above said first plate to permit material to be placed upon said first plate when against said abutments.

4. A die comprising a base, a cutter extending upwardly from said base, a plate having an opening above and larger than said cutter, a series of guide pins for guiding said plate in its movements, springs encircling said pins and supporting said plate above the plane of the upper edge of said cutter, a series of abutments extending upwardly through and movable independently of said plate, springs for supporting said abutments, parts on said abutment pins engaging against said plate and limiting upward movement of said guide pins, a plate for holding the material upon said first named plate and having a hole larger than and above said cutter, a pivot device supporting said second plate, a rigid support, and means carried by said support for adjusting and holding said base and thereby said cutter in selected vertical planes.

5. A cutting die comprising a base, a block attached to said base, a cutter attached to said block, a plate for supporting the work and having a hole larger than said cutter to permit projection of said cutter therethrough, resilient devices for supporting and guiding said plate, abutment pins in connection with said block extending through said plate, flanges on said abutment pins engaging the underside of said plate and limiting upward movement of said abutment pins, springs for supporting said abutment pins, in said position, and a movable plate for holding the work upon said first named plate and against said abutment pins.

6. A cutting die comprising a base, a block attached to said base, a cutter attached to said block, a plate for supporting the work and having a hole larger than said cutter to permit projection of said cutter therethrough, resilient devices for supporting and guiding said plate, abutment pins in connection with said block extending through said plate, flanges on said abutment pins engaging the underside of said plate and limiting upward movement of said abutment pins, springs for supporting said abutment pins in said position, a movable plate for moving the work upon said first named plate and against said abutment pins, and pivot elements for supporting said second plate and permitting movement of said second plate toward and from said first plate.

7. A cutting die comprising a base, a block attached to said base, a cutter attached to said block, a plate for supporting the work and having a hole larger than said cutter to permit projection of said cutter therethrough, resilient devices for supporting and guiding said plate, abutment pins in connection with said block extending through said plate, flanges on said abutment pins engaging the underside of said plate and limiting upward movement of said abutment pins, springs for supporting said abutment pins in said position, a movable plate for moving the work upon said first named plate and against said abutment pins, pivot elements for supporting said second plate and permitting movement of said second plate toward and from said first plate, and devices cooperating with said pivot elements for yieldingly supporting said second plate away from said first plate.

ROY V. WOODWORTH.